Figure 4:
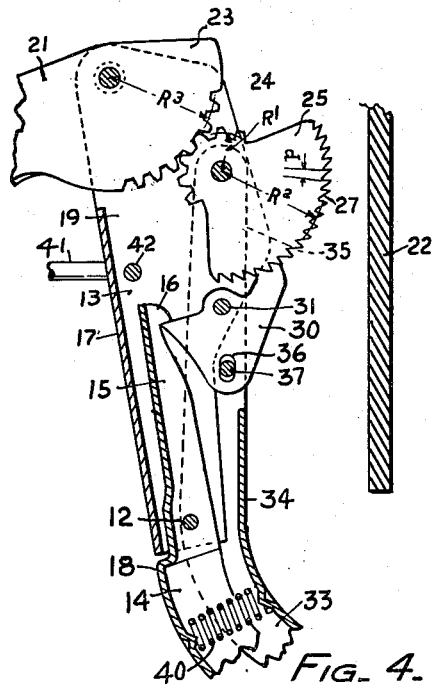

June 13, 1939.　　　　　F. D. WENN　　　　　2,162,684
AUTOMOTIVE BRAKE LEVER
Filed March 26, 1938　　　　3 Sheets-Sheet 1
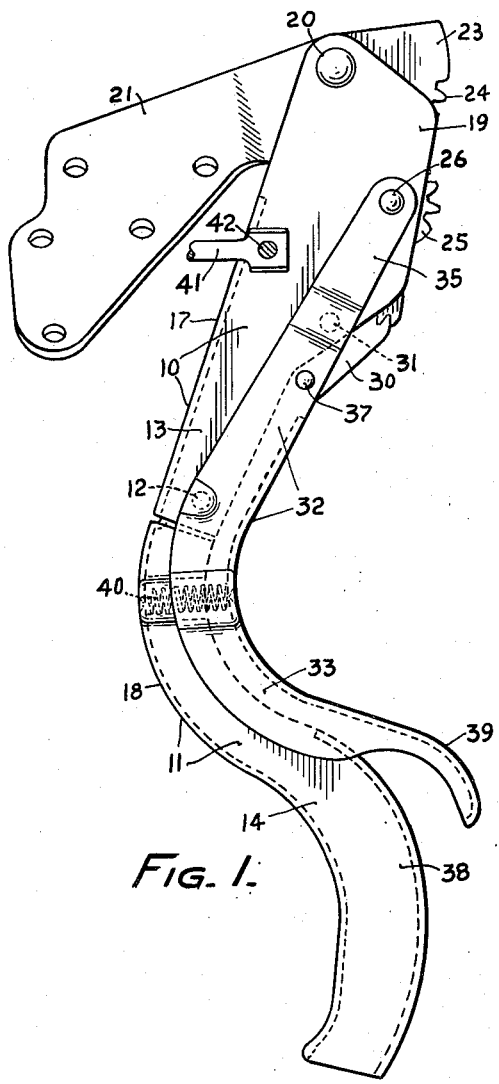
Fig. 1.
Fig. 2.
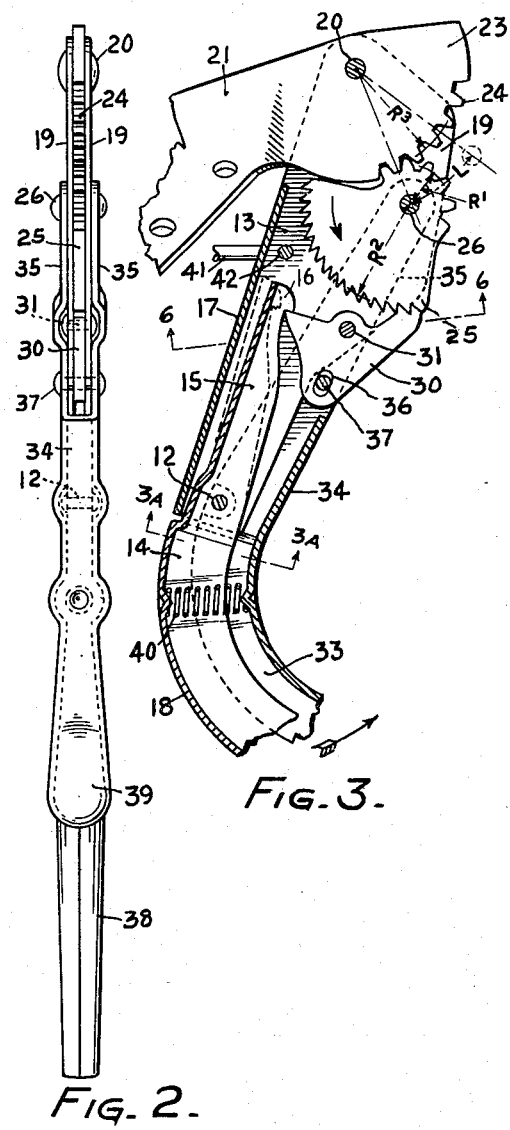
Fig. 3.
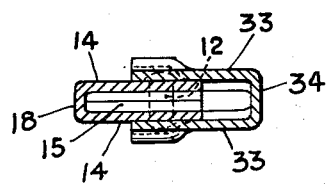
Fig. 3A.
Floyd D. Wenn,
INVENTOR.
BY Louis Illmer
ATTORNEY.

June 13, 1939.  F. D. WENN  2,162,684
AUTOMOTIVE BRAKE LEVER
Filed March 26, 1938   3 Sheets-Sheet 2

Floyd D. Wenn,
INVENTOR.

BY Louis Illmer
ATTORNEY.

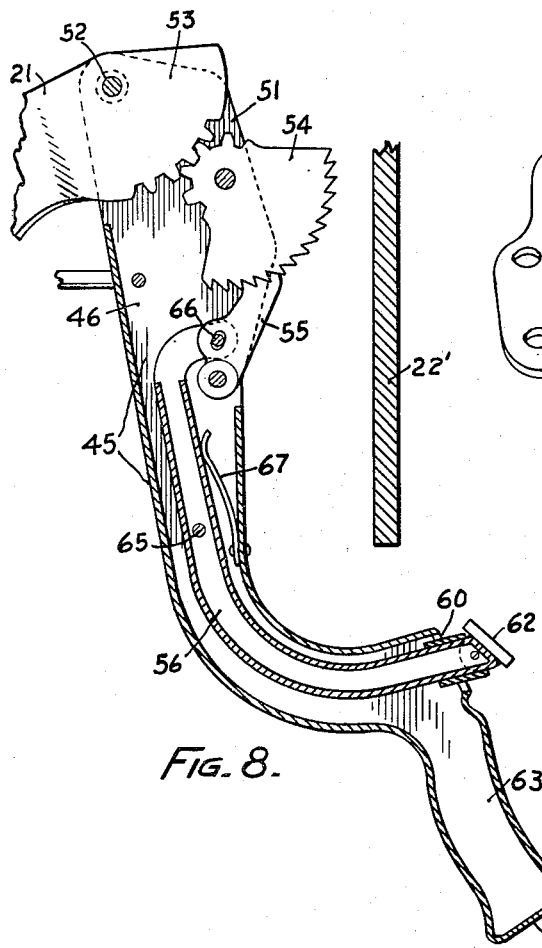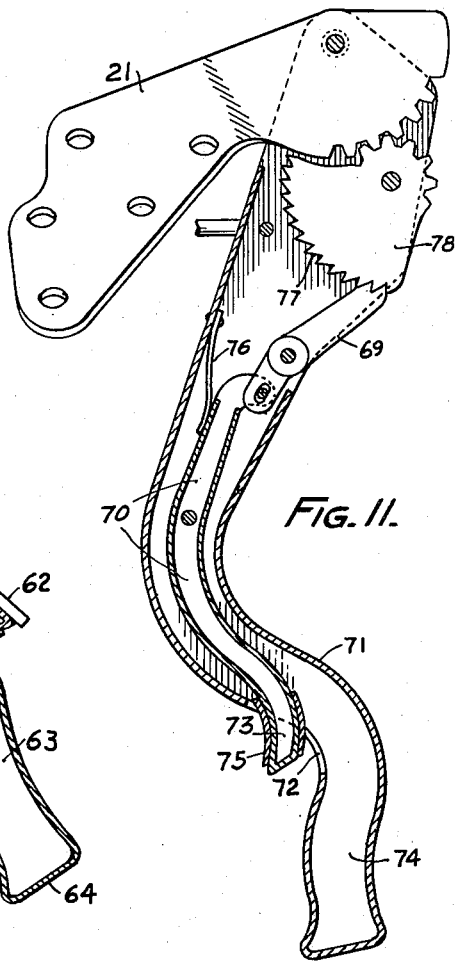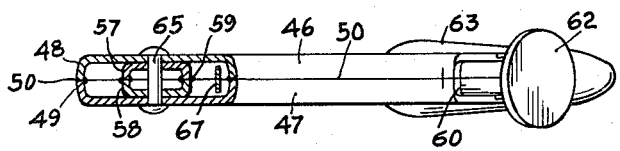

Patented June 13, 1939

2,162,684

UNITED STATES PATENT OFFICE 2,162,684

AUTOMOTIVE BRAKE LEVER

Floyd D. Wenn, Binghamton, N. Y., assignor to The Brewer-Titchener Corporation, Cortland, N. Y., a corporation of New York Application March 26, 1938, Serial No. 198,184

7 Claims. (Cl. 74—530)

This invention relates to certain novel brake lever appurtenances and more particularly pertains to an emergency or the like hand control for automotive or other vehicle brakes of which the principal lever components may be economically stamped up from sheet metal and compactly assembled within narrow confines. Because of special ratchet devices and other structural improvements, my lever is easy to reset subsequent to applying its associated brakes, and also possesses safety against inadvertent pawl release after protracted tooth wear.

By the use of a nested multiplying gear or pivoted step-up plate of a lobated sector that meshes with relatively strong teeth shaped on an arcuate rack, I am enabled to effect a finer ratchet tooth adjustment than is to be had by bringing the pawl into direct engagement with such course rack teeth. An advantage thereof resides in the fact that when the applied brake rod has been drawn up to its maximum allowable tension and it is desired to closely retain such lever adjustment as an operative setting, the incidental pawl slip back may be materially reduced.

My primary lever may either be constructed as a one-piece or sectionalized type. Cooperating therewith, is a trip lever section arranged to actuate the detent means and which remotely controlled means may be positively retained against accidental release.

The instant compactly assembled lever is more especially designed as a suspended hand brake lever mounted in accordance with present day practice to turn about a main fulcrum supported by stationary bracket means located behind the instrument board of an automotive vehicle. Such a swinging lever is preferably given a sharply kinked S-shaped contour in order to clear said board and to provide its depending end with a pistol-like grip having a manipulative thumb piece located in the vicinity of the lower knee or kink whereby to release the pawl through the trip lever.

The object of the present invention is to devise a relatively simple and effective brake lever assembly of the indicated character, adapted to be neatly incorporated within automotive bodies and fabricated on a rapid productive basis at a low shop cost, a more outstanding feature residing in the use of a flat faced multiplying gear plate shaped to provide for reversely lobated sector components in which all associated teeth extend from face to face thereof.

Embodied herein are also other structural innovations designed to expedite the end in view, such as the stamping up of my primary S-shaped lever from sheet metal in mated counterparts that may be welded together into a tubular unit having a closed grip end, all of which will hereinafter be more explicitly defined.

Reference is had to the three accompanying sheets of drawings which are illustrative of alternative embodiments, and in which:

Fig. 1 is an elevational side view of an assembled lever equipped with my improved pawl means, and Fig. 2 shows a rear edge view thereof.

Figs. 3 and 4 respectively depict a fragmental cross-sectional detail taken centrally through Fig. 2 to reveal my gear sector plate and pawl in alternative positions.

Figures 6, 9:
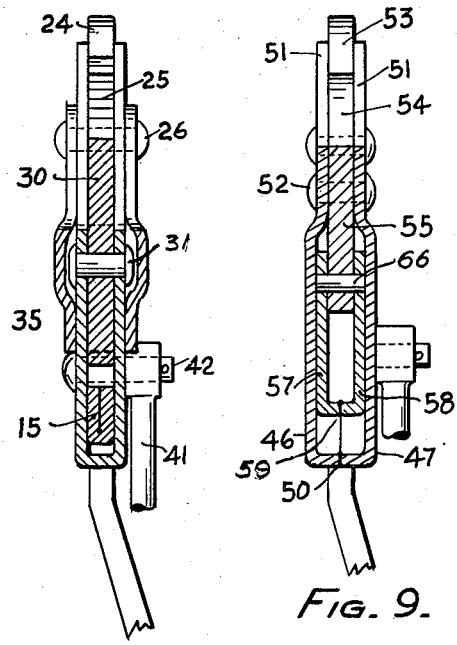
Figure 5:
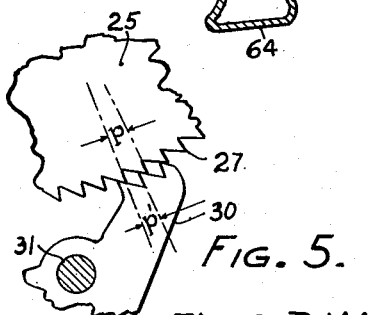

Fig. 5 fragmentally illustrates a certain slipback tooth effect, and Figs. 3A and 6 are respectively taken along lines 3A—3A and 6—6 of Fig. 3.

Figure 7:
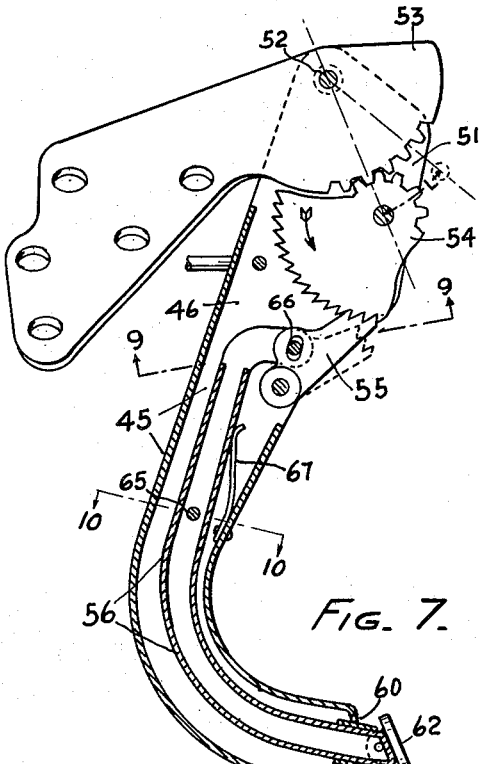

Figs. 7 and 8 respectively present diverse modifications of the lever construction shown in Figs. 3 and 4.

Figs. 9 and 10 are respectively taken in cross-section along lines 9—9 and 10—10 of Fig. 7.

Fig. 11 is similar to Fig. 7 but provides for a different style of trip lever.

Referring first in detail to the Figs. 1 to 6 discloses, my brake lever in one of its alternative forms, may comprise a primary lever of S-shaped configuration that may be stamped up from sheet metal to constitute a thigh section 10 and a handle or shank section 11. The respective section ends may be pivotally connected by the knuckle joint 12. Each lever component is here given an open channeled cross-sectional profile whose pairs of flanges such as 13 or 14 are respectively interconnected by the webs 17 and 18. The mated flanges 14 are intended to constitute an encased tongue 15 for the handle section and which extension terminates in a pawl locking hook 16 disposed between the spaced thigh flanges 13.

The free end region of said thigh may be forked as at 19 and mounted to turn around a fixed main fulcrum 20. Said fulcrum may be upheld by bracket means 21 disposed closely behind the vertical instrument board 22 of an automobile, as indicated in Fig. 4. This bracket may be attached to some suitable cowl fixture and equipped with a stationary arcuate rack 23 having a series of relatively coarse gear teeeth 24 cut concentrically about the fulcrum axis. The center region of said rack may be apertured to allow of pivotally entering the fulcrum 20 therethrough, the suspended thigh forks 19 then being arranged to straddle the rack, as shown.

A multiplying gear or step-up sector plate 25 is nested flatwise between the forked thigh flanges to rotate on the sector pivot 26. The perimetric edge of such unitary plate preferably embraces reversely disposed, hub interconnected sector lobes. The opposed circular edges of said sector plate are respectively serrated with teeth located at different radial distances from the interposed hub pivot 26, one such circular edge portion being cut to smoothly mesh with the rack gear teeth 24 disposed on an inner edge radius R1 closely adjacent to the sector pivot, and the other circular edge having a series of finer ratchet teeth 27 cut thereon at a pitch spacing $p$ of which the outer radius R2 is kept materially larger than R1. The rake of the ratchet teeth are inclinedly directed for one-way action and both sets of sector teeth are purposely made to extend between common planes corresponding to the biplanar spacing given to the lever forks.

The triangular pawl 30 is likewise snugly interposed flatwise between the thigh flanges 13 and mounted to turn about the pawl pivot 31. One apex of said pawl has a plurality of ratchet teeth cut thereon adapted to operatively mesh with the teeth 27 and another apex may be pointed to engage the tongue hook 16 when the thigh and shank lever sections assume a certain inclination about their pivot 12.

A sheet metal trip lever 32 may also be given a cross-sectionally channeled profile to include a pair of spaced side flanges such as 33 and an interconnecting web 34. Said flanges are preferably disposed to embracingly receive the primary lever flanges therebetween in reversed web relationship (see Fig. 3A). The upper terminal of such trip lever may be forked as at 35 and mounted to freely turn about the sector pivot 26 or the equivalent thereof. The remaining apex of said pawl may be radially slotted at 36 and have a slip pin 37 entered therethrough as carried by the trip lever in the cleared manner disclosed in Fig. 3.

The depending end of the shank or handle section 11 is shaped to provide for a pistol-like grip 38. The corresponding trip lever end is kept relatively shorter to constitute a depressible thumb piece 39 or remote pawl control located at the lower kink region of my S-shaped primary lever. A single compression spring 40 serves to automatically thrust the pawl into active engagement with its ratchet teeth. The brake rod 41 may be attached to the thigh section by the pivot 42 which is preferably located closely contiguous to the ratchet teeth circle as in Fig. 3. The aim is to secure a substantial grip leverage for a given overall length and thereby obviate any excessive rearward swing on part of the primary lever into the driver's compartment.

By placing the brake rod pin further away radially from the main fulcrum 20, a greater rod travel will be obtained but at a correspondingly reduced leverage or draft pull. As indicated in Fig. 4, the thumb piece 39 may be faced toward the driver's seat. By virtue of my multiplying sector plate 25, a comparatively small swing imparted to the primary lever when setting up the brakes in the direction of the Fig. 3 arrow, will bring about a relatively larger angular step-up movement in the ratio of R3/R1, whereby to augment the linear travel of the ratchet teeth 27 with respect to the pawl 30. For the same reason, the resulting load on the engaged pawl will be smaller for a given counter pull on the draft rod 41.

In explanation of such travel, reference is had to Fig. 5. When the applied brake rod has been drawn up under maximum allowable tension and it is desired to closely hold such operative setting, the incidental pawl slip back marked $p'$, must first be slackened up before the pawl can effectively grip the hardened ratchet teeth 27. My multiplying sector plate minimizes such slip back and if allowed to become excessive, the hand brake may fail to properly hold the car in an emergency or while standing on a steep hillside. Such interposed step-up sector may also serve to reduce rounding by wear of the ratchet tips. A further aim is to confine the overall width of my suspended brake lever end within narrow limits. The rack plate, the step-up plate and the flat pawl are herein all given substantially the same face width size whereby to compactly nest all of their associated teeth endwise between closely spaced lever forks.

It will be observed that the trip lever pivot 26 lies radially inward of the slip pin 37 to correctly release the pawl 30 when the thumb piece 39 is depressed toward the primary lever grip 38. As regards the function of the pawl interlocking hook 16, this is substantially identical in purpose with the reversed mode of action disclosed in my copending application Serial Number 145,209 filed May 28, 1937. Assuming the jointed primary lever to stand in its Fig. 3 or released brake position, then by initially drawing rearwardly upon the grip 38 in the direction of the arrow, such pull serves to alter the normal inclination of the lever sections 10 and 11 about the knuckle joint 12 and initially withdraws the hook 16 into its dotted position.

The thumb piece 39 of the trip lever is thereby unlocked. By pressing said thumb piece toward the grip 38, the primary lever may now be swung rearwardly toward the driver through an angular distance marked L in Fig. 3, to carry the sector plate into its Fig. 4 or set brake position. Upon manual release of the lever grip, said hook automatically falls into engagement with the pawl 30 and positively locks the same after the unavoidable tooth slip back $p'$ has been taken up. For an angular swing L of the primary lever about its main fulcrum 20, the corresponding shift imparted to the step-up sector 25 about its pivot 26 is multiplied to afford a finer selection for the tooth engagement of the pawl 30.

In order to attain a still more compact installation with respect to the otherwise interfering instrument board 22, the present automotive trend is toward more sharply bent knee regions for the Fig. 3 style of crooked hand brake lever. However, the use of such cross-sectionally channeled primary lever shapes, presents considerable inherent stamping difficulty when formed out of a single sheet metal blank in that the dies become unduly complicated and the parallelly crooked deep lever flanges tend to wrinkle in the region of such more pronounced S-shaped curvatures. As a remedy and to the end that sharply arcuate lever components may be more satisfactorily and cheaply produced to conform with any desired contour, I preferably resort to the following improved structure.

Instead of attempting such fabrication by drawing deep web interconnected flanges out of flat stock in one piece, a flat part-line of a compound die may be taken transversely of conventional practice and each lever section built up in mated right-hand and left-hand counterparts of which the respective registering edges are butt welded into unitary tubular formation. In a modern automotive brake lever, its width is generally kept comparatively narrow in relation to the flat side face dimension thereof. The cited stamping procedure therefore permits the use of a comparatively shallow edge draw irrespective of the S-shaped curvature that may be given thereto and without having to bend edgewise any deep side flanges. In addition, there results a cross-sectionally closed structure which is intrinsically stiffer and adapted to have the trip lever wholly concealed therein.

Figs. 7 to 10 detail a built-up lever of this kind. As will be apparent from these disclosures, the tubular primary lever 45 is here integrally fashioned to comprise mated stamped sheet-metal counterparts 46 and 47 (see Fig. 10), each having a corresponding shapes that respectively include a flat bottom wall with an upturned perimetric dip component such as 48 or 49, of which the edges may be ground flush by disc grinders and flash welded along 50 to constitute an interconnecting seam for these sharply arcuate shaped lever sections. Certain web forming portions of my complementary blanks are cut away to provide for laterally spaced suspension forks such as 51.

In the present instance, the pawl locking hook 16 of Fig. 3 has been omitted as non-essential. This alternative lever may be provided with a main fulcrum 52, an arcuate rack 53, a step-up sector plate 54 and a pawl 55, all of which are analogous to the previously described similar working parts. In Fig. 7, the pawl is actuated somewhat differently by means of a balanced trip lever 56 which as indicated, may be stamped up in two superimposed counterparts 57 and 58 that may also be seam welded at 59. If preferred, such L-shaped trip lever may be solid forged. An entered lever of this shape may be unobstructedly threaded into the open mouth or forked end of the welded primary lever. The nast named lever is apertured rearwardly to constitute the mouth 60 of sufficient size to allow one trip lever end to freely slip therethrough. Embracing said one end is a rubber sleeve or other silencing agency 61. Such trip lever terminal may further be equipped with an attached thumb piece or push button 62. A piston-like grip 63 depends from the lower knee region of the primary lever and it is emphasized that the tip 64 of said grip can readily be kept closed by the present style of welded fabrication.

Intermediate its ends, said balanced trip lever is pivoted at 65 to the respective counterparts 46 and 47. The upper end of the trip lever may be linked to the pawl by the slip pin 66. By depressing the push button 62 inwardly toward the gripped lever, the pawl may be shifted into its dotted released position (see Fig. 7), whereupon the primary lever may be freely swung in either direction. A flat return spring 67 serves to automatically throw the pawl into operative engagement.

Fig. 11 closely corresponds with Fig. 7 except for the linkage disposition between the modified pawl 69 and the upper end of the balanced trip lever 70. In this instance, the forward edge of the butt welded primary lever 71 is shown slotted at 72. The depending trip lever end is extended therethrough to provide for a finger trigger 73 that may be drawn rearwardly toward the grip 74 to release pawl engagement. A resilient cushioning sleeve 75 may likewise serve as an anti-rattle medium. The reversed spring 76 tends to return the pawl teeth in operative engagement with the ratchet teeth 77 on the step-up sector gear 78. In other respects this lever is intended to perform in a manner substantially identical to that previously described in connection wtih Figs. 1 to 6, except that the engaged pawl is not positively locked in place.

By the introduction of my multiplying sector plate, the ratchet teeth stop faces need to be reversed over corresponding one-way teeth when applied directly to a stationary arcuate rack in the conventional manner and hence requires an inverted mounting for the trip lever linkage. An outstanding problem here solved resides in how to incorporate and snugly assemble such linkage and multiplying gearing flatwise within the opposed side faces of an S-shaped primary lever when these faces are narrowly spaced to provide for a neat trim acceptable for modern automotive requirements. At the same time, the grippable depending lever end is exposed beneath the instrument board within convenient reach of the car driver and has a closely associated finger or thumb piece whose manipulation will readily be understood.

In my lever layout, its rearward swing travel from released to set up brake position may be reduced so as not to interfer unduly with the entrance to or exit from the driver's seat. By resort to the disclosed geared step-up sector, the ratchet teeth are nevertheless given adequate travel to permit using a relatively large number of faced ratchet teeth that may be pawl engaged with entire safety against inadvertent slip, although unlocked by a hook such as 16.

It may further be pointed out that my novel lever structure built up in S-shaped counterparts is likewise applicable where it is deemed expedient to omit the use of said multiplying gear and have the pawl directly engage fine pitched ratchet teeth that are cut on an enlarged arcuate perimeter of a stationary rack such as 23. For any given leverage with respect to the draft rod pin 42 as measured radially from the main fulcrum 20, a considerably larger number of ratchet teeth 27 can be brought into pawl engagement by the use of my interposed multiplying sector plate 25.

It is thought the foregoing detailed explanation will make evident to those skilled in this art, the intended function and structural aspects of my lever components, it being understood that I reserve the right to reasonably modify my illustrative embodiments, all without departing from the spirit and scope of my invention heretofore described and more particularly pointed out in the appended claims.

I claim:

1. A compactly assembled automotive emergency brake lever comprising web interconnected sheet metal side flanges of which one end is provided with handle means and the other end is forked in spaced biplanar relation, a stationary rack plate having a series of gear teeth thereon concentrically arranged about an axis with certain of such teeth disposed to extend between the fork planes, a main fulcrum entered through the flange forks and the rack plate in substantial coincidence with said axis, a unitary step-up plate pivotally nested between said planes and provided with identical complementary flat side faces whose perimetric contours are each shaped in registry to embrace reversely lobated sector components respectively having a circular plate edge region located at opposed different radial distances from the step-up plate pivot, the outer edge region having ratchet teeth thereon that respectively terminate flush with the fork planes and the inner edge region having gear teeth thereon that also terminate flush with the same planes and mesh with said rack teeth whereby to multiply the linear travel of the ratchet teeth with respect to that of the gear teeth when said lever is swung about the main fulcrum, and manipulative pawl means arranged to successively engage certain of the ratchet teeth.

2. A compactly assembled automotive emergency lever comprising web interconnected sheet metal side flanges of which one end is provided with grippable handle means and the other end is forked in spaced biplanar relation, a stationary rack plate having a series of gear teeth concentrically arranged about an axis with certain of such teeth disposed to extend between the fork planes, a main fulcrum entered through the flange forks and the rack plate in substantial coincidence with said axis, a unitary step-up plate pivotally nested between said planes and provided with identical complementary flat side faces whose perimetric contours are each shaped in registry to embrace reversely lobated sector components respectively having a circular plate edge region located at opposed different radial distances from the step-up plate pivot, the outer edge region having ratchet teeeth thereon that respectively terminate flush with said fork planes and the inner edge region having gear teeth thereon that also terminate flush with the same planes and mesh with said rack teeth whereby to multiply the linear travel of the ratchet teeth with respect to that of the gear teeth when said lever is swung about the main fulcrum, automatic pawl means arranged to successively engage certain of the ratchet teeth, and an elongated trip lever pivotally mounted intermediate its ends to a lever flange, one terminal of said trip lever being operatively connected to actuate the pawl and the other trip lever terminal being manipulatively depressible toward the grippable handle and serving to release the engaged pawl.

3. A compactly assembled automotive emergency lever comprising web interconnected sheet metal side flanges of which one end is provided with grippable handle means and the other end is forked in spaced biplanar relation, a stationary rack plate having a series of gear teeth concentrically arranged about an axis with certain of such teeth disposed to extend between the fork planes, a main fulcrum entered through the flange forks and the rack plate in substantial coincidence with said axis, a unitary step-up plate independently pivoted between said planes and provided with identical complementary flat side faces whose perimetric contours are each shaped in registry to embrace reversely lobated sector components respectively having a circular plate edge region located at opposed different radial distances from the step-up plate pivot, the outer edge region having ratchet teeth thereon that respectively terminate flush with the fork planes and the inner edge region having gear teeth thereon that likewise terminate flush with the same planes and mesh with said rack teeth whereby to multiply the linear travel of the ratchet teeth with respect to that of the gear teeth when said lever is swung about the main fulcrum, remotely controlled pawl means arranged to successively engage certain of the ratchet teeth, and manipulative means serving to positively lock the pawl against inadvertent disengagement from a particular tooth.

4. A compactly assembled emergency brake lever comprising web interconnected sheet metal side flanges of which one end is provided with handle means and the other end is forked in spaced biplanar relation, a stationary rack plate having a series of gear teeth thereon concentrically arranged about an axis with certain of such teeth disposed to extend between the fork planes, a main fulcrum entered through the flange forks and the rack plate in substantial coincidence with said axis, a unitary multiplying plate pivotally nested between the fork planes and provided with identical complementary flat side faces whose perimetric contours are each shaped in registry to embrace reversely lobated sector components respectively having circular plate edge regions located at opposed different radial distances from the step-up pivot, the outer edge region of one such component having ratchet teeth thereon that respectively terminate flush with the fork planes and include radially disposed tooth faces whose respective rakes are slopingly directed for one-way ratchet action and the inner edge region of the other component having gear teeth thereon that also terminate flush with the same planes and mesh with said rack teeth whereby to step up the linear travel of the ratchet teeth with respect to that of the gear teeth when said lever is swung about the main fulcrum, and remotely controlled pawl means pivotally mounted to a lever flange and which pawl is automatically brought into successive operative engagement with certain of the ratchet teeth when the lever is swung in one direction, the aforesaid stepped up linear travel serving to mitigate tooth slip back after setting up the applied brake lever.

5. An assembly including the following principal stamped sheet metal elements in combination: an automotive hollowed emergency brake lever comprising web interconnected side flanges of which one end is provided with handle means and the other end is forked in spaced biplanar relation, a stationary rack plate having a series of gear teeth thereon concentrically arranged about an axis with certain of such teeth disposed to bridge the flange forks, there being a main fulcrum entered through said forks and the rack plate in substantial coincidence with said axis, a unitary step-up plate independently pivoted between said forks and provided with identical complementary flat side faces whose perimetric contours are each shaped in registry to embrace reversely lobated sector components respectively having a circular plate edge region located at opposed different radial distances from the step-up plate pivot, the other edge region having ratchet teeth thereon that respectively terminate flush with the side faces of the step-up plate and the inner edge region having gear teeth thereon that also terminate flush with the same faces and mesh with said rack teeth whereby to multiply the linear travel of the ratchet teeth with respect to that of the gear teeth when said lever is swung about the main fulcrum, and a manipulative flat sided pawl pivoted between the forked end of the lever flanges and arranged to successively engage certain of the ratchet teeth, corresponding side faces of said pawl, of the step-up plate and of the rack plate all lying in substantial flatwise alignment with respect to a contiguous fork plane.

6. A cross-sectionally tubular sheet metal lever comprising a pair of laterally spaced side forming components of S-shaped contour of which opposed margins are respectively web interconnected and one end of which lever is provided with handle means and the other end is forked in spaced biplanar relation, the web interconnections being initially split and built up in sections from reversely superimposed counterparts having registering abutting web forming portions that are permanently united along a seam, a stationary rack plate having a series of gear teeth thereon concentrically arranged about an axis with certain of such teeth disposed between the flange forks, a main fulcrum entered through said forks and the rack plate in substantial coincidence with said axis, a unitary step-up plate independently pivoted between said forks and provided with identical complementary flat side faces whose perimetric contours are each shaped in registry to embrace reversely lobated sector components respectively having a circular plate edge region located at opposed different radial distances from the step-up plate pivot, the outer edge region having ratchet teeth thereon that respectively terminate flush with the side faces of the step-up plate and the inner edge region having gear teeth thereon that also terminate flush with the same faces and mesh with said rack teeth, and a manipulative flat sided pawl pivotally nested between the forked end of the lever flanges, the respective corresponding side faces of said pawl, of the step-up plate and of the rack plate being uniformly spaced and disposed in substantial flatwise alignment with respect to a contiguous fork plane.

7. A brake lever assembly of the suspended type including a stamped primary lever of sheet metal comprising a pair of relatively flat side forming components that are narrowly spaced apart in relation to the face width thereof and the opposed marginal regions of which flanges are in part web interconnected to constitute an endless cross-sectional profile and one end of which primary lever is provided with a sharply kinked pistol grip and the other end is forked in spaced biplanar relation, said web interconnections being initially split and built up in sections from reversely superimposed counterparts having registering abutting web forming portions that are permanently united, a stationary rack plate having a series of gear teeth thereon concentrically arranged about an axis with certain of such teeth disposed between the flange forks, a main fulcrum entered through said forks and the rack plate in substantial coincidence with said axis, a unitary step-up plate independently pivoted between said forks and provided with identical complementary flat side faces whose perimetric contours are each shaped in registry to embrace reversely lobated sector components respectively having a circular plate edge region located at opposed different radial distances from the step-up plate pivot, the outer edge region having ratchet teeth thereon that respectively terminate flush with the side faces of the step-up plate and the inner edge region having gear teeth thereon that also terminate flush with the same faces and mesh with said rack teeth, a remotely controlled pawl pivoted to a lever flange and arranged to successively engage certain of the ratchet teeth, and a medially pivoted trip lever mounted within the primary lever of which one trip lever end is operatively connected to the pawl and its other end unobstructedly projects through a web mouth located in the aforesaid kinked region of the primary lever.

FLOYD D. WENN.